United States Patent

Rao et al.

[11] Patent Number: 5,490,445
[45] Date of Patent: Feb. 13, 1996

[54] ULTRA LOW DEVICE VOLUME PISTON SYSTEM

[75] Inventors: V. Durga N. Rao, Bloomfield Township; David A. Yeager, Plymouth, both of Mich.

[73] Assignee: Ford Motor Company, Dearborn, Mich.

[21] Appl. No.: 213,400

[22] Filed: Mar. 14, 1994

[51] Int. Cl.$^6$ .................... F01B 31/10; B32B 15/18
[52] U.S. Cl. .................... 92/155; 92/160; 92/186; 92/252; 123/193.6; 277/165
[58] Field of Search .................... 92/153, 155, 160, 92/186, 192, 222, 298, 249, 223, 250, 252; 123/193.6; 277/138, 165 R, 216, 217, 221

[56] References Cited

U.S. PATENT DOCUMENTS

| | | |
|---|---|---|
| 2,410,405 | 11/1946 | Cornelius . |
| 2,519,683 | 8/1950 | Marien . |
| 2,575,214 | 11/1951 | Garland et al. . |
| 2,609,260 | 9/1952 | Marien . |
| 2,817,562 | 12/1957 | Fleming et al. . |
| 3,012,831 | 12/1961 | Cheney et al. . |
| 3,095,204 | 6/1963 | Neely . |
| 3,149,543 | 9/1964 | Naab .................... 92/155 |
| 3,675,738 | 7/1972 | Bush .................... 92/155 |
| 3,917,290 | 11/1975 | Geffroy . |
| 3,938,814 | 2/1976 | Cromwell . |
| 3,942,808 | 3/1976 | Gross . |
| 4,079,661 | 3/1978 | Goloff .................... 92/222 |
| 4,612,260 | 9/1986 | Kumagai . |
| 4,735,128 | 9/1988 | Mahrus et al. . |
| 4,844,487 | 7/1989 | Eakin .................... 277/221 |
| 4,868,067 | 9/1989 | Fujisawa et al. .................... 92/155 X |
| 5,029,880 | 7/1991 | Johansson .................... 277/193 |
| 5,133,564 | 6/1992 | Chang . |
| 5,149,109 | 9/1992 | Jelinek et al. .................... 277/221 X |
| 5,158,052 | 10/1992 | Yoshimura . |

FOREIGN PATENT DOCUMENTS

| | | | |
|---|---|---|---|
| 0200649 | 12/1992 | Japan .................... 123/193.6 |
| 2164418 | 3/1986 | United Kingdom .................... 277/221 |

*Primary Examiner*—Edward K. Look
*Assistant Examiner*—Hoang Nguyen
*Attorney, Agent, or Firm*—Joseph W. Malleck; Roger L. May

[57] ABSTRACT

A piston and ring assembly operative within a cylindrical bore wall to retain pressurized fluid to one side of the assembly, the piston having a crown and an annular side wall for movement along the bore wall. The assembly comprises a piston having at least on annular groove (the groove having an enlarged height of at least 4 mm) in the side wall of the piston; at least two split compression rings in each such groove effective to each substantially annularly engage the bore wall, the rings having mating superimposed surfaces to facilitate movement of the rings in unison as a result of friction therebetween; a compressed elastomeric ring (constituted of polysilanes, such as silastic with strengtheners) disposed in said groove (having a compression of 10–20% at room temperature), acting between the piston and ring most-remote from said piston crown, to resiliently bias at least the most-remote-ring against the bore wall; a solid film lubricant coating essentially all the sides of said groove; and non-mating surfaces of solid lubricant carried by the rings to effect reduced friction between said rings and groove when being biased by the elastomeric ring.

15 Claims, 6 Drawing Sheets

ULTRA LOW DEVICE VOLUME PISTON SYSTEM

BACKGROUND OF THE INVENTION

1. Technical Field

This invention relates to the design of piston and cylinder assemblies and more particularly to improvements that not only reduce the crevice volume of the piston cylinder assembly but enhance sealing contact of the piston rings with reduced friction over an increased temperature range including very low as well as very high temperatures.

2. Discussion of the Prior Art

This invention addresses the problem of differential thermal expansion of a piston relative to its cylinder bore wall causing the piston rings to either provide undue tightness with the bore wall at ultra cold temperatures, such as −20° F., or provide excessive looseness at high temperatures, such as 300° F. The spring tension of conventional piston rings fail to accommodate such wide extremes of temperature. In addition, this invention addresses one or more of five other problems characteristic of current designs for high-temperature piston-cylinder assemblies: (i) excessive crevice volume, (ii) excessive blow-by of fluids, (iii) premature ring fatigue failure, (iv) induced oil combustion, and (v) high cost of machining ring grooves.

Crevice volume (which means the space between the piston and cylinder bore wall, including the groove spaces, up to generally the point of sealing of the bottom compression ring) increases with clearance between the piston crown and bore wall, and increases with groove size. Large crevice volumes are inherent in current piston cylinder designs for commercial automotive internal combustion engines and thus allow for the presence of some unburned fuel and thereby the tendency to increase emissions. Moreover, greater fuel is injected into the combustion chamber at cold start to initiate and sustain combustion; resulting unburned fuel is not readily converted by the catalyst during cold start. Consider also that the design of the piston relative to the cylinder bore is set for the smallest clearance at cold start conditions; thermal expansion of the piston material relative to the bore material, (i.e., aluminum piston to a cast iron bore) will cause the crevice volume to increase at higher temperatures. .

It would be ideal to have a piston that reciprocates within a cylinder bore with no clearance between the piston (crown or skirt) and the bore wall and with little or no friction under all operating conditions. However, to attain durability of the interfacing materials of the piston and cylinder bore wall, materials have been restricted to those which generate undesirable friction, such as iron or steel coated with nickel or chromium for the piston rings, iron or aluminum for the bore walls which sometimes is coated with wear resistant coatings, and iron or aluminum for the piston skirt which sometimes is coated with wear resistance coatings. Attaining zero clearance is even more difficult; the material selection will cause the clearance for pistons in typical cast iron cylinders at top dead center, to vary. For example, aluminum pistons will cause the clearance to vary between 15 microns and 60 microns. The clearance can nearly double under warm operating conditions. Moreover, the bore wall may be scuffed under severe cold start conditions because liquid lubricant may not be present in the ring grooves.

Blow-by allows fluids or combustion gases to leak past piston rings to eventually foul the lubricant on the other side of the rings and create ash within the lubricant itself. Such leakage can be by migration past the backside, front-side or through the split ends of the rings. Gas leakage is usually accompanied by poor oil film scrapping allowing oil to migrate upward into the combustion chamber resulting in contamination by deposits on the combustion chamber walls. Blow-by, particularly front-side leakage, reduces engine compression and robs the engine of its designed power. Conventional ring design is set to create the smallest ring gap at high pressure/high load conditions since the high pressure behind the compression ring will force better sealing contact. But at low load, low speed conditions, gas pressure will not be there and thus the ring gap can get very sloppy. Gas pressure, which acts downwardly on the compression rings, may also freeze the ring against the bottom of the groove or against another ring, induced by high friction; this reduces the ability to maintain proper ring gap with the bore wall. The end gap between the ends of a split piston ring can also increase at high speed allowing an even greater combustion gas leakage.

Premature fatigue failure of a ring is caused by high gas pressure freezing the compression rings to their grooves while the piston slaps against the bore wall jarring and stressing the frozen ring counter to its tension while it is dragged against a non-conforming cylinder wall. Since reciprocating forces change magnitude and direction every 720° F., such stressing constitutes impact loading of the ring; impact loading leads to groove wear, ring instability (commonly referred to as flutter), and eventually ring failure by fatigue.

Induced oil consumption results from a type of peristolic pumping action of oil trapped between the oil ring and the second compression ring (the space adjacent the land between these two rings). On the upward stroke of the piston, such trapped oil is forced back up past the compression rings or behind the compression rings into the combustion chamber. Oil induced into the combustion chamber leaves a residue or carbon deposit. Induced oil consumption can be significant because oil in the land space is effectively pumped upward during the intake stroke at low speed low load engine conditions. The prior art has experimented with several two-ring designs and three-ring designs to eliminate this problem. However, all of the designs proposed to date have either increased oil consumption while reducing friction or reduced oil consumption by increasing friction with higher ring tension.

Narrow rings (having low height) limit the interfacing contact with the bore wall. Thin or narrow grooves are much more expensive and difficult to machine on a high volume basis. Large grooves with single rings have proved unworthy and inoperable.

The chronological history of piston ring design for automotive applications shows repeated effort to prevent blow-by (loss of compression) noting that the rings did not seal effectively against the bore wall or noting that leakage occurred through the grooves supporting the rings. A variety of wear resistant coatings have been applied to the ring grooves as well as to the exposed circumferential sealing surface of the rings (see nickel coating in U.S. Pat. No. 2,575,214; chromium coating in U.S. Pat. No. 3,095,204; and combination coating of Ni, Co—Mo or Mo in U.S. Pat. No. 3,938,814). Flutter of the rings under reverse loading permitted gas and fluid leakage in spite of such coatings and was hoped to have been overcome by increasing the sealing contact pressure of the split rings in each of the spaced grooves. Unfortunately, such increased contact pressure increases friction which then leads to eventual groove or ring wear in spite of oil lubrication.

Applicants are unaware of any design efforts that successfully increase the sealing pressure of the piston rings without increasing piston friction particularly at wide temperature extremes.

SUMMARY OF THE INVENTION

It is an object of this invention to overcome the problems recited above and to provide an economical solution to them.

The invention is a piston and ring assembly operative within a cylindrical bore wall to retain fluid to one side of the assembly. The assembly comprises (a) a piston having at least one annular groove in the side wall of the piston; (b) at least two split compression rings in each groove, effective to each substantially annularly engage the bore wall, the rings having mating superimposed surfaces to facilitate the rights to move in unison as a result of friction therebetween; (c) a compressed elastomeric ring disposed in said groove acting between the piston and the ring most remote from the piston crown to resiliently bias at least the most-remote-ring against the bore wall; (d) a solid film lubricant coating essentially all the sides of the groove; and (e) non-mating surfaces of solid lubricant carried by the pair of rings to effect reduced friction sliding movement along a groove side while being biased by the elastomeric ring. Such assembly substantially reduces blow-by of pressurized fluids, reduces the crevice volume, eliminates pumping of oil into the chamber above the piston while reducing flutter of the compression rings, and substantially reduces premature ring failure. The solid film lubricant assists in eliminating freezing of the rings against the groove sides, increasing ring fatigue life, enhancing ring tension and reducing engine emissions.

DETAILED DESCRIPTION IN BEST MODE

Figure 1:
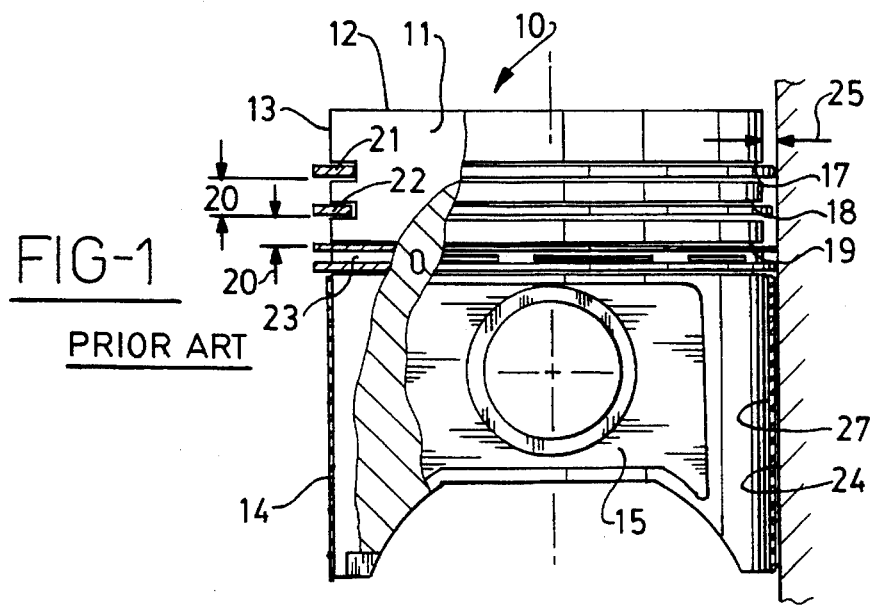
FIG. 1 is an elevational view, partially broken away, of a conventional prior art piston construction.
Figure 3:
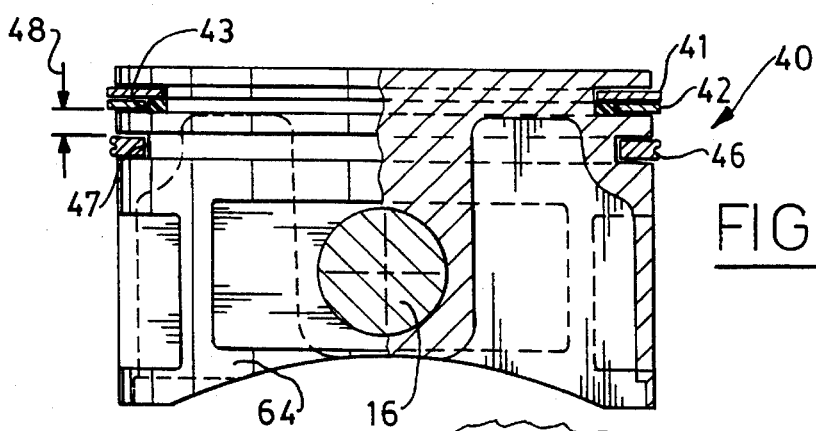
FIG. 3 is an elevational view, partially broken away, of a piston assembly incorporating the principles of this invention.
Figure 2:
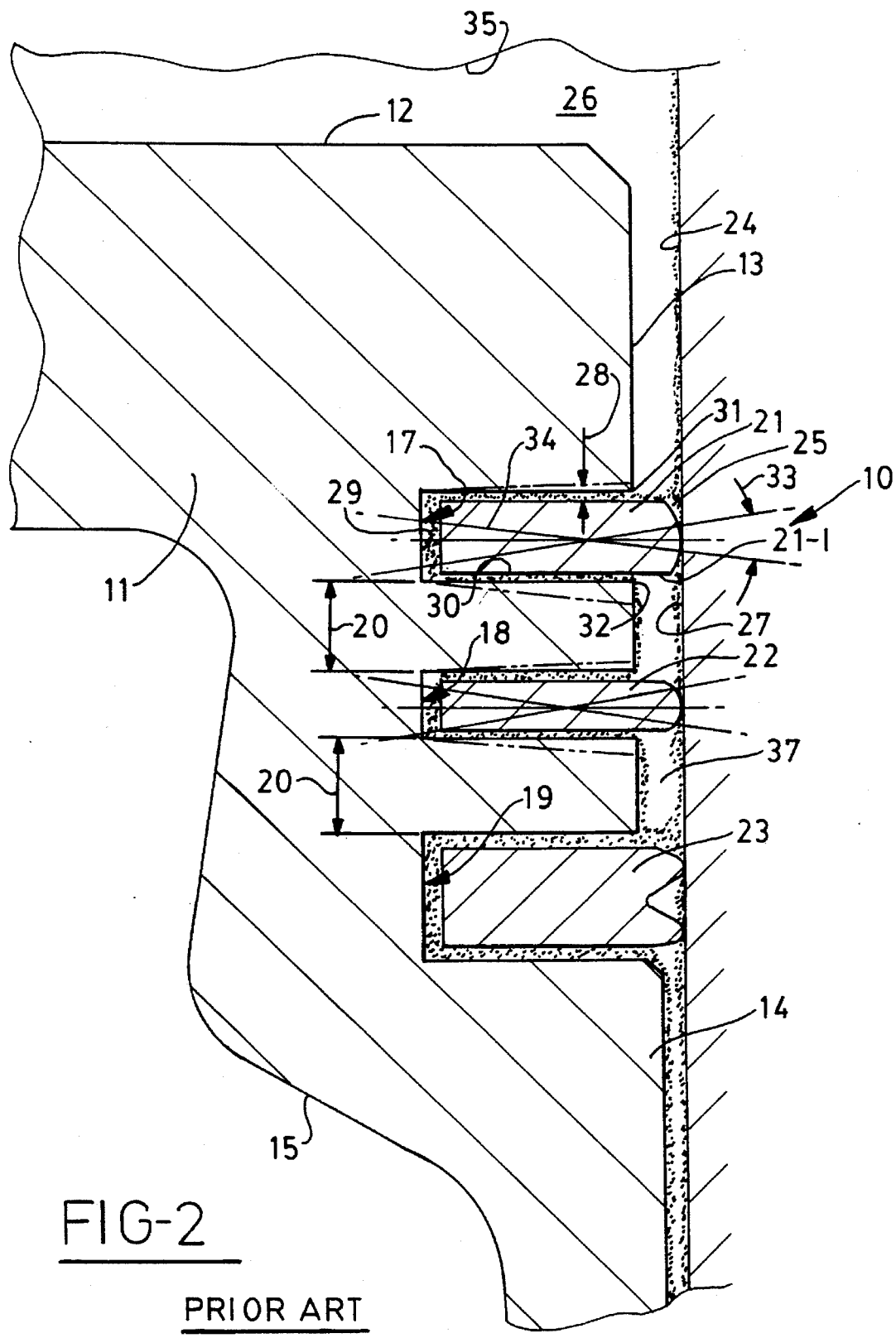
FIG. 2 is a highly enlarged sectional view of a portion of the prior art piston ring assembly of FIG. 1, showing how blow-by occurs and how oil contamination of combustion gases occurs.
Figure 7:
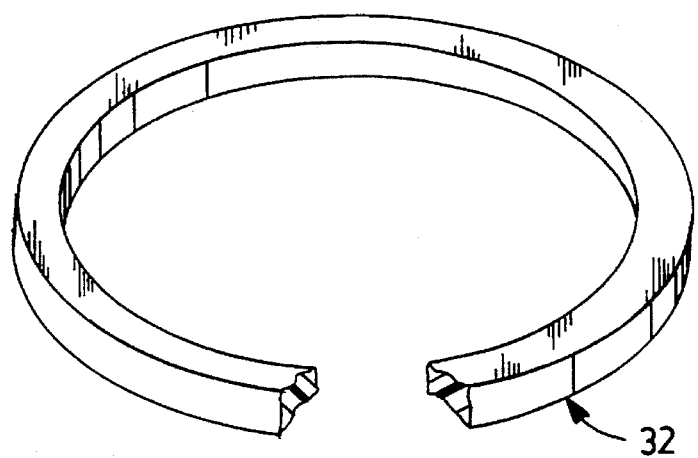
FIG. 7 is a perspective view of the elastomeric ring, broken away at one location.
Figure 6:
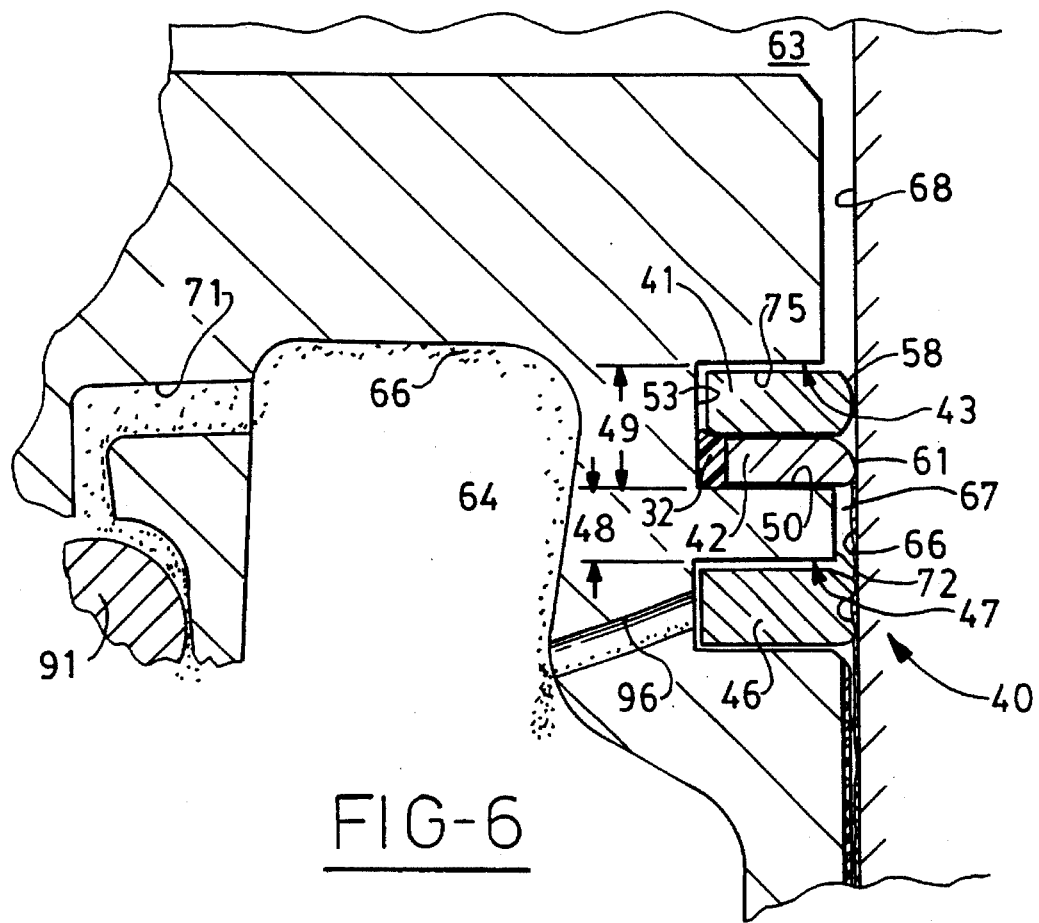
FIG. 6 is a fragmentary enlarged view of FIG. 3.
Figure 8:
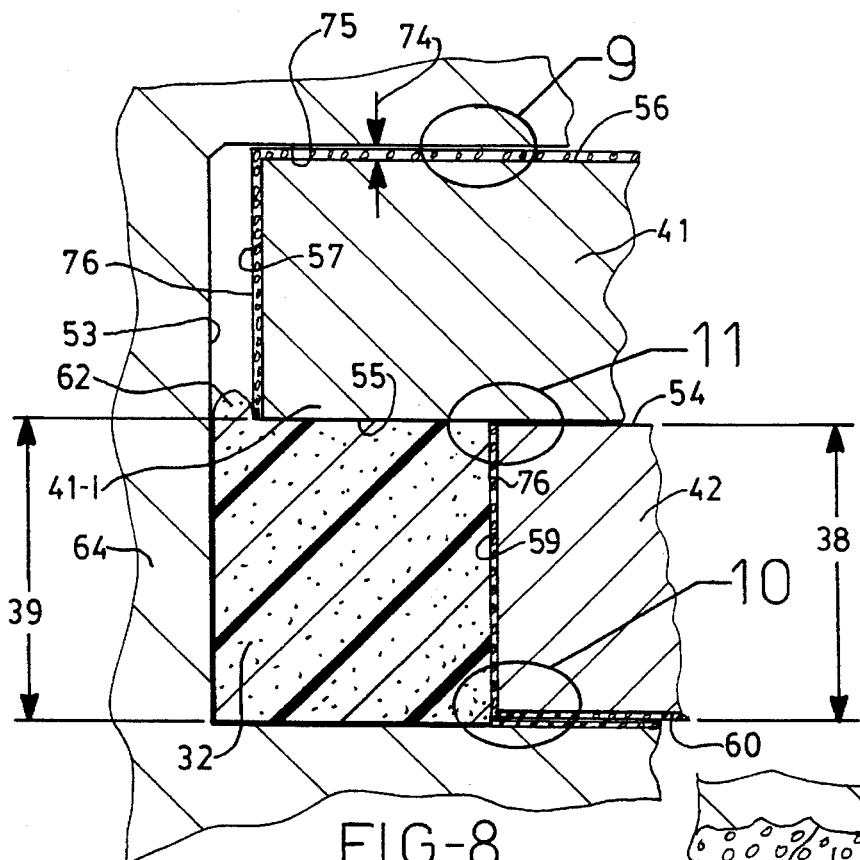
FIG. 8 is a greatly enlarged view of a portion of FIG. 6.
Figure 9:
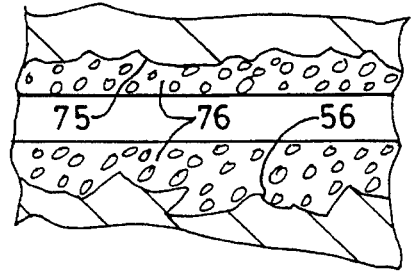
FIGS. 9, 10, and 11 are still further enlarged views of designated portions of FIG. 8.
Figure 10:
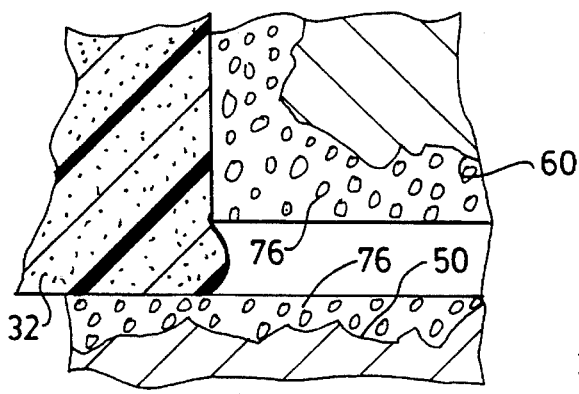
Figure 11:
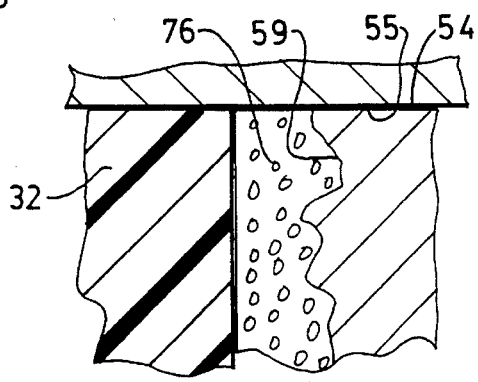
Figure 13:
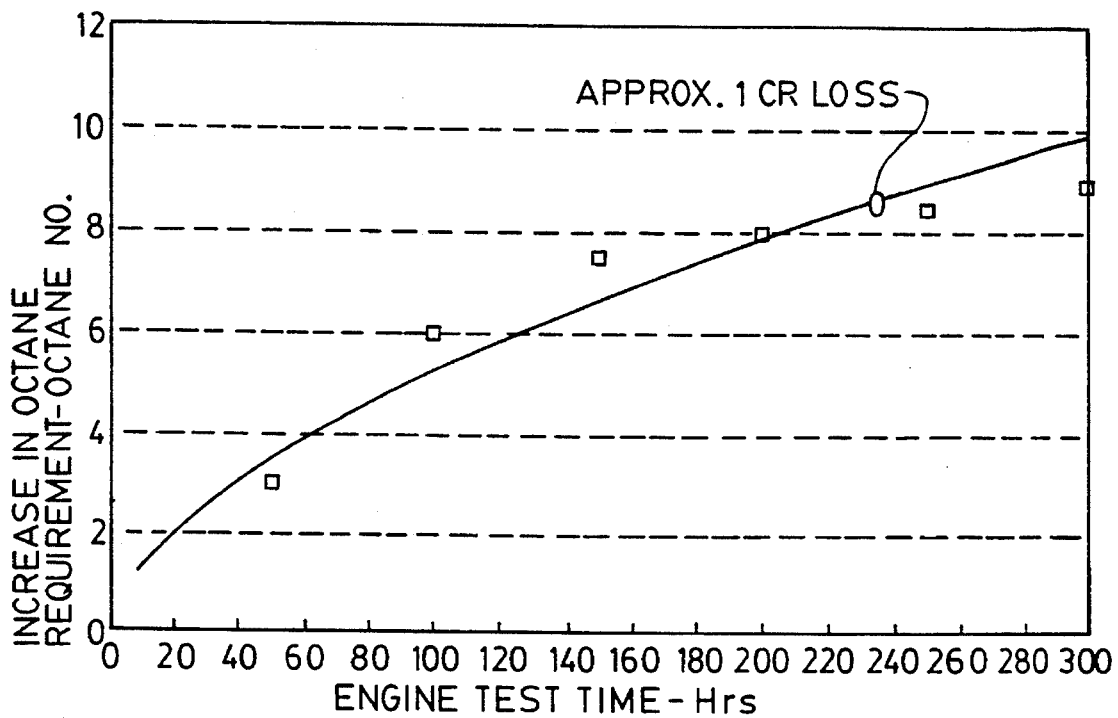
FIG. 13 is a graphical illustration of octane increase as a function of test time for an engine with varied chamber deposits.

Some explanation of how prior art piston assemblies function is necessary to understand the advance of this invention. A typical prior art piston ring assembly 10 is shown in FIGS. 1 and 2, consisting of a piston 11 having a crown 12, side wall 13, skirts 14 depending from the side wall and an interior connecting structure 15 for connecting the piston to a connecting rod pin 16. The side wall has three annular grooves 17,18,19 each aligned with the plane of the piston crown, and each spaced apart an axial distance from the other a distance 20 of about 2 to 10 mm. The top groove 17 contains a first split compression ring 21, the second groove contains a second split compression ring 22, and the bottom groove contains an oil control scrapper ring 23. The rings are usually made from cast iron or steel and are of nearly the same thermal expansion characteristic as that of the bore wall 24 resulting from casting the block or by use of a liner.

The top compression ring 21 provides sealing between the combustion chamber 35 and the crank case 36. The second ring 22 functions primarily as an oil scrapper during the down stroke as well as functioning as a gas seal. The oil control ring 23 scrapes oil off the bore during the down stroke as well as maintain a film in the space between the top and second compression rings during the up stroke; the oil control ring 23 is of very high tension to provides adequate sealing against gas pressure and provide effective oil scrapping. More than 50% of the piston ring friction against the bore wall is attributed to the oil control ring and is even greater when bore distortion is present requiring very high ring tension to achieve adequate sealing.

Each of the compression rings are designed to provide for a ring gap, such as at 25, with the cylinder bore wall 24 which is adequate to avoid interference under the most severe operating condition (usually the high speed/high load operation of the engine). Such ring gap 25 will, however, allow a significant blow-by of combustion gases 26 at low speed/low load conditions of the internal combustion engine. This increased gap at low speed/low load conditions results from the ring sticking to the groove sides during some strokes and pulling away from the groove side in other strokes. The gases that blow-by contain combustion products as well as unburned charge which leads to deterioration of the oil lubricant (which is so necessary for maintaining a lubricating film 27 on the cylinder bore and other parts of the engine). Since a major portion of the vehicle operating cycle involves low speed/low load conditions, contamination and fouling of the oil lubricant makes it necessary to change oil and oil filters at regular intervals which optimally should be eliminated.

Each of the compression rings are affected by the combustion gas 26 acting on the top of such rings which presses them against the bottom of the respective groove with a force proportional to the gas pressure. The gases have access to the top of the rings by virtue of a clearance 28 in each groove which typically is about 100 mm. Such gas pressure also acts on the radial inner surface of each ring (such as surface 29 of ring 1) to assist the tension force of the metallic ring. The combustion gas force is at its maximum near the top dead center (TDC) after ignition. This high axially-directed force continues to press the rings down on the bottom side of the grooves (such as bottom side 30 of groove 17) when the piston side load changes from the minor thrust side to the major thrust side. But the piston 11 imparts a side load, acting against the bottom surface of the rings (such as surface 21-1 of ring 21), as the piston moves from the minor thrust side to the major thrust side, to jar the rings against the bore wall. It has been erroneously assumed by the prior art that such side load did not contribute to ring contact force with the bore wall. It is now known that the contribution of the piston side load is equal to the product of the side load and the friction coefficient of the contacting surfaces. If the ring sticks to the groove side (such as side 17) due to high friction, the ring contact force will be high. Any relative motion between the ring and groove is very slow and oscillating under such loading; it can be accurately assumed that the friction between the ring and groove side walls falls in the mixed lubrication zone corresponding to a friction range of about 0.12–0.15. This is a high friction coefficient; the friction force is cyclic and can induce fatigue failure of the metallic piston ring.

Cyclic impact loading can cause ring flutter. The ring inertia force resulting from piston motion, gas load and friction force between the ring and the bore wall change both direction and magnitude cyclicly every 720° F.; thus, the groove edges, such as at 31 and 32, are subjected to cyclic impact loading. Under certain conditions ring flutter can and will occur (see tilt angles 33 of the ring plane 34). The flutter can cause groove wear at such edges increasing the clearance between the ring and the groove. Often the groove can wear progressively at both the groove root and groove edges. Excessive groove wear causes not only flutter but also ring instability. Damage resulting from the groove wear becomes progressively worse and, when oil is trapped in such enlarged clearances without venting, may lead to excessive oil consumption by virtue of a peristolic pumping action during piston reciprocation.

Oil migrates past ring 23 into the space 37 between the piston side wall 13 and the bore wall 24, and disposed axially between the oil scrapping ring 23 and the second compression ring 22. Such oil, during cyclic upward strokes, can be pushed behind the compression rings 22 and 23 and sequentially pumped into the combustion chamber 35. Oil consumption can increase significantly as oil is collected in the space 37 during the intake stroke at low speed/low load engine operation.

Another major portion of the blow-by occurs through the end gap of the split rings (the space between the split ends of the compression rings). The combustion gases are able to force their way down through the gap between the split ends of the rings creating a path around the sealing rings.

The inventive piston and piston ring assembly of this invention is distinctively different. A preferred embodiment is shown in FIGS. 3–11; a piston assembly 40 provides for two compression rings 41,42 matingly superimposed one upon another in a single enlarged-height groove 43 with the split ends 44,45 of each of the compression rings out of superimposed axial alignment. Enlarged height means a groove having a distance 49 (which is at least 2 mm and preferably about 4 mm) extending between the radially disposed sides 50,51 of the grooves. An elastomeric ring 52 is disposed between the lowermost ring 42 and the root 53 of the groove 43. Although the elastomeric ring has a height 39 generally equal to the height 38 of the lowermost ring 42, under initial compression during installation, a portion or neck 62 of the ring may bulge into the space between the groove root and the uppermost ring 41.

Figure 14:
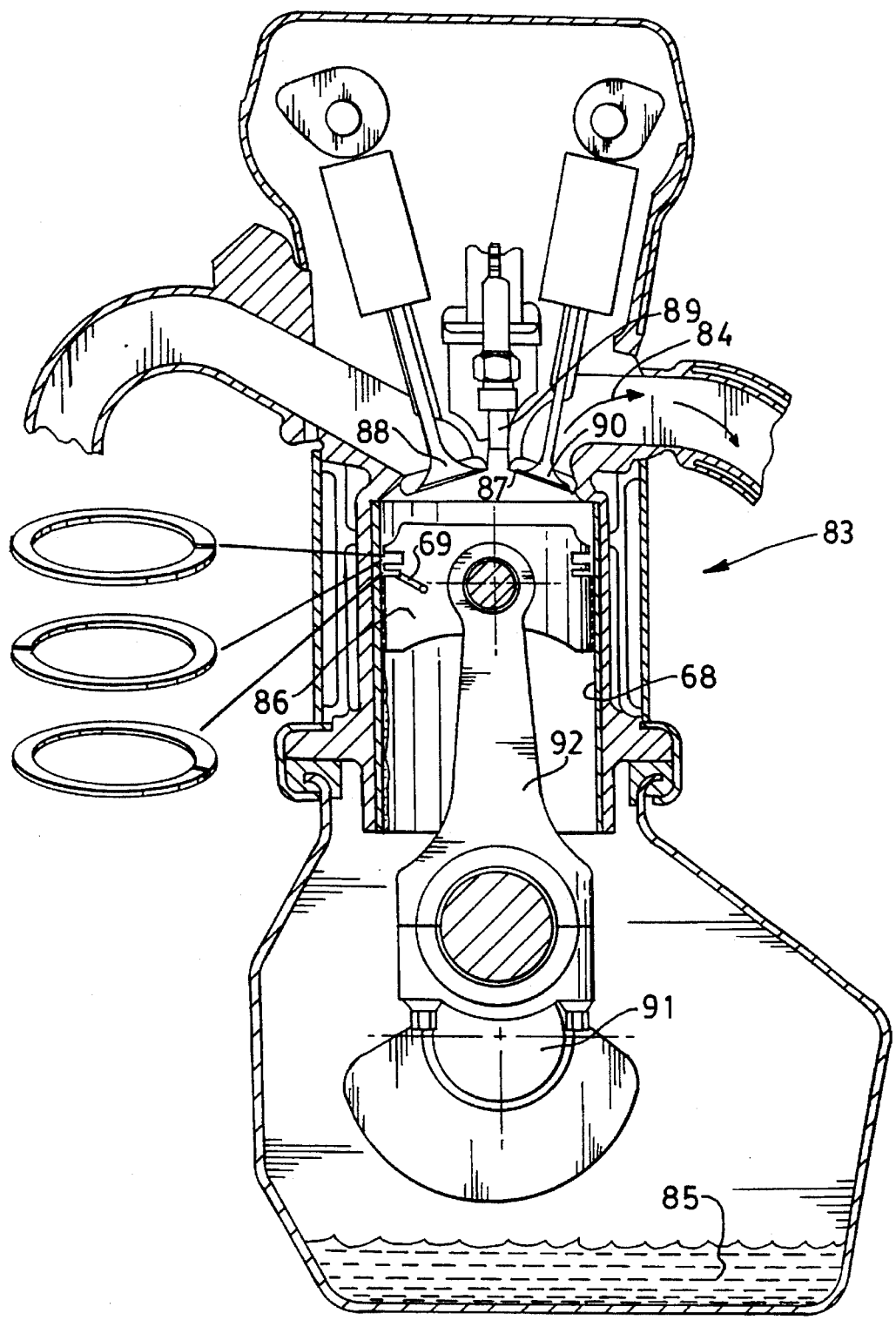
FIG. 14 is a central sectional elevational view of an engine incorporating the piston assembly of this invention.

A conventional oil control ring 46 may be used in groove 47 spaced a distance 48 from groove 43. Lubrication oil 66, normally supplied by the engine to lubricate the connecting rod pin 91, may be conveyed or diverted by channel 71 to splash and bathe the interior side 64 of the piston. Alternatively, oil jets 75 from tubes 73 supported in the crankcase above the crank main bearings (see FIG. 14) is directed to splash the interior side 64. This effectively reduces the piston wall temperature behind the rings to only a few degrees above the oil temperature, typically well below 300° F. under most conditions. Such oil splashing removes heat from the piston particularly along the body of piston metal that defines the grooves 43 and 47. This is particularly important to maintaining a temperature environment for ring 32 and state-of-the-art elastomeric materials, such as T-340L4 (consisting of polysilanes and vitron) to no greater than 350° F. under the most severe operating conditions. To prevent any oil from being trapped in the space 67 between the oil ring 47 and rings 41–42, vent 96 communicates the interior of groove 47 with the interior of the piston to allow oil to drain back to sump; this is in conjunction with a tighter height clearance between the rings 41–42 and their groove 43, functions to substantially eliminate peristolic oil pumping with the combustion chamber of the engine. The compression rings may be made of conventional iron or steel (hollowed to reduce mass and tension) or lighter metals such as aluminum. The surfaces of the groove 43 as well as the non-mating surfaces 56,57,58,59,60,61 of the pair of compression rings are coated with a solid film lubricant in a coating thickness usually of about 10 microns or less. The coating may be eliminated from one or more of the rings if such rings are constituted of a solid lubricant material, such as graphite. In such event, the ring would present a solid lubricant surface to the groove sides, but a coating would have to be applied to the ring mating surfaces to enhance friction therebetween.

The groove as a whole can have a much greater height than allowed by prior art grooves (the groove height has heretofore been dictated by the need to keep rings thin to control ring tension). The groove of increased height can have an aspect ratio (depth to height) which is less than 10 and preferably less than 5. Each ring 41,42 resides essentially in a different space of the groove with the uppermost ring 41 having its surface 55 engageable with the top surface 54 of the lowermost ring 42. The uncoated mating surfaces 54,55 should have a coefficient of friction of 0.12–0.15 or more. A leak path #1 which would follow behind the rings (along surfaces 57 or 59) and underneath either of the rings (along surfaces 54 or 60) is closed off under all operating conditions. A leak path #2 which would follow between the outer circumference of the rings (surfaces 58,61) and the bore wall 68 is closed or becomes essentially zero clearance therebetween. A leak path #3 through the rings between the split ends is reduced to a negligible amount because of the superimposed non-alignment.

The elastomer ring 32 is located behind only the lower compression ring 42 to insure free movement of ring 42 under all extremes of operating temperatures. The elastomer ring should have a compression even under temperatures as cold as −20° F. and will expand significantly under temperatures as high as 350° F. to retain compression even at high extremes.

If the rings are fabricated of aluminum (such as alloy 6061 or stronger) and the piston is cast of an aluminum alloy, there will be little change in the clearance between the rings and groove due to thermal expansion. The clearance can be designed much tighter in tolerance, such as 10 microns or less, if the SFL coating, for the groove and non-mating surfaces of the rings, is comprised of a very fine particle size insuring an ultra smooth and uniform thin thickness. The elastomer ring will have a higher thermal expansion than that of the piston and rings (as much as 10 times that of aluminum), so that at higher temperatures, the rings are urged against the bore wall with a suitably higher contact pressure. The elastomer will have a compression under such expansion of about 25%.

The combined features operate to eliminate blow-by (through leak paths #1, #2 and #3) in this manner: the combustion gas pressure 63 presses down on the top surface 56 of the upper compression ring 41 forcing the pair of compression rings 41,42 to contact each other along their mating uncoated surfaces 54,55. The absence of oil between these mating surfaces and the normally high friction coefficient (i.e. 0.12–0.15) of such surfaces will ensure movement of the pair of rings as a unit or couple. During the compression and expansion strokes of the piston, the upper compression ring 41 may act as an effective seal. As the gas pressure 63 increases during the upward movement of the piston during the compression stroke, a corresponding pressure increase occurs on the top surface 56 of the upper compression ring 41 as well as against the radially inner surface 57 forcing the upper ring 41 to assist the inherent ring tension to make sufficient contact against the oil film 66 of the bore wall 62. The lower compression ring 42 will assist the upper ring as a result of the resiliency of the elastomeric ring which moves the rings 41 and 42 as a unit due to friction therebetween. The lower surface 60 of the lower compression ring 42 is free to glide with almost little or no friction on the bottom surface 50 of the groove due to the presence of the solid film lubricant coatings therealong. The unitized rings, being free to move laterally, exert tension against the oil film of the bore wall. Gas pressure is blocked from migrating between the upper and lower rings due to frictional lock between such rings and the seal between the elastomer ring 52 and the end 41-1 of the upper ring. The elastomeric ring, being under compression, seals against the groove root and prevents gas migration behind ring 42. Leak path #1 is thus blocked. Blow-by will not occur between the inner contacting surfaces 61,58 of the compression rings and the bore wall because the rings are free to adjust radially with no sticking or friction. Thus leak path #2 is blocked.

Although the tension force of the lower compression ring is somewhat lower than that of the upper compression ring, the upper compression ring will be assisted by gas pressure to provide sufficient sealing resulting in little or no blow-by. Because of the rapid increase in gas pressure inside the top compression ring 41, it possesses improved sealing. The lower compression ring, is designed to be essentially an oil film scrapper (has barrel shaped outer edge contour) during the downward motion of the piston and contributes little or no friction.

Figures 4, 5:
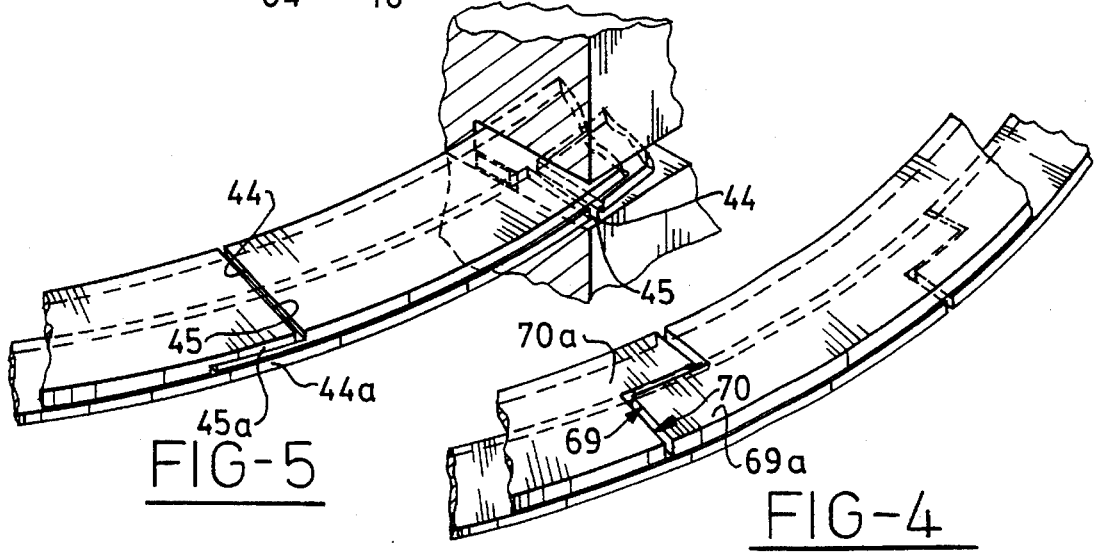
FIGS. 4 and 5 are each a perspective view of a pair of mating superimposed piston rings useful with and forming part of this invention, each view depicting a different dovetail construction for the split ends of the rings.

As shown in FIG. 5, the split ends 44-45 of the upper and lower compression rings are out of superimposed alignment and may be referred to hereafter as being overlapped. In addition each end pair of split ends is dovetailed or overlapped in a circumferential direction. This feature is important because of the tight union maintained between the upper and lower compression rings resulting from the force of gas pressure; the leakage path for combustion gases (to migrate through any gap or spacing between the split ends) is eliminated due to this dual overlapping condition. In FIG. 5, the dovetailing construction creates overlapping tongues, such as 44*a* and 45*a*. As shown in FIG. 4, the dovetailing may be in a radial direction whereby each of the split ends 69,70 of the ring are stepped radially to possess a notch creating tongues 69*a* and 70*a*; the tongues are overlapped in a radial direction of the ring, and the ring ends are overlapped circumferentially. Because the superimposed rings block any direct path through the rings, leak path #3 is essentially eliminated.

The crevice volume of the piston and ring assembly is reduced. Such volume is affected by (1) the clearance between the compression ring and groove bottom and sides, and (2) the selection of materials that affect (i) length of the space above the rings that resides between the piston land and bore wall, and (ii) the radial gap of the land above the rings with the bore wall. If a high strength alloy (Aluminum or iron) is selected for the piston, the land space can be shortened; if the piston and bore wall metals are matched, thermal growth differences can be controlled to reduce land radial gap. In any event, this invention permits the crevice volume to be reduced by up to 25% over the prior art.

By virtue of the ease of glide of the compression rings as a tandem unit within the enlarged groove, the lateral movement of the rings is facilitated; flutter and cocking of the rings within their grooves is substantially reduced. Prior art conditions, which previously produced ring fatigue, are now eliminated due to the presence of the solid film lubricant and by incorporating an oil vent 96. The vent is in communication with land 72 between the oil ring and groove 43 and is in communication with the crankcase oil sump; peristolic oil pumping past the compression rings is substantially eliminated. The lower compression ring 42, because it is frictionally bonded with the top compression ring and glides free on the groove bottom, combines with slow but accelerated downward motion of the pistons to provide improved oil film scrapping permitting little or no excess oil to migrate into the combustion chamber; scrapped oil is routed to the sump through the space 67 to the vent 69. The clearance 74 between the upper surface of the ring 41 and the groove surface 75 (when the unitized rings are pressed against the bottom of the groove by pressure forces) is no greater than about 60 mm. Such clearance 74 cooperates with the friction-free glide of the rings to eliminate cocking or flutter.

Substantial elimination of upward migration of oil into the combustion chamber (by peristolic pumping) is important because it eliminates carbon deposits on the combustion chamber walls from oil. Such deposits force engine designers to keep the engine compression ratio lower to avoid preignition or knock caused by hot deposits. With this invention (which provides essentially zero clearance to the thin oil film on the bore wall and the substantial elimination of peristolic-ring-pumping of oil into the combustion chamber by reduction of the crevice volume and ring flutter) compression ratio (such as 10.5 instead of 9.8) for a given sized piston can be increased; this provides improved engine power which can be increased as much as 5%.

The material of the solid film lubricant coating does not rely on graphite or any one lubricant by itself, but rather upon a specific combination of solid lubricants that perform well at high temperatures (at least up to 600° F.) and attract oil. The lubricants are carried in a polymer or carrier that assists in replenishing the lubricant with water at high temperatures. The solid film lubricants of the coating comprise a mixture of at least two elements selected from the group consisting of graphite, $MoS_2$ and BN; the mixture is carried in a polymer emulsion for deposition, the polymer (polyamide type) adhering the film coating to its anodized support and providing hydrocarbon attraction (oil attraction). Graphite, once selected, should be present in an amount of 29–58% by weight of the mixture. Graphite is effective as a solid lubricant usually up to temperatures around 400° F. Molybdenum disulfide, when selected, should be present in an amount of 29–58% by weight of the mixture and most importantly is effective to increase the load bearing capability of the mixture up to a temperature of at least 580° F. but will break down at temperatures in excess of 580° F. in an air or nonreducing atmosphere. Molybdenum disulfide reduces friction in the absence of oil or in the presence of oil and, most importantly, supports loads of at least 10 psi at such temperatures. Molybdenum disulfide is also an oil attractor and is very useful in this invention. Boron-nitride, when selected, should be present in an amount of 7–16% by weight of the mixture and increase the stability of the mixture up to temperatures as high as 700° F. and concurrently stabilizes the temperature for the ingredients of Molybdenum disulfide and graphite. Boron-nitride is an effective oil attractor.

Particle size control of the individual ingredients for the solid film lubricant mixture is important to avoid subsequent machining. The particles should be ultra fine, no greater than 4.0 microns. Graphite can be introduced into the mixture in the range of 0.5–4.0 microns, Molybdenum disulfide in the range of 0.3–4.5 microns, and Boron-nitride at about 5 microns. The mixture is typically ball milled to produce an average particle size of 0.3–4.0 microns. Boron-nitride is capable of supporting loads of 5 psi but as part of the mixture with graphite and boron-nitride in the aforementioned polymer, loads as high as 500 psi at temperatures up to 400° F. can be supported.

The optimum mixture contains all three ingredients, which will provide for a temperature stability up to temperatures as high as 700° F., load bearing capacities well above 10 psi and excellent oil attraction capability. The combination of all three elements will provide a coefficient of friction which is in the range of 0.07–0.08 at room temperature and a coefficient of friction as low as 0.03 at 700° F.

The thermoset polymer is preferably comprised of epoxy or polyamide, such as epon, present in an amount of 20% to 60% of the mixture. The polymer cross-links at temperatures of 375° F. to form a rigid cement-like structure that provides hydrocarbon and water vapor transfer to graphite while attracting oil and adheres very well to an aluminum metal support that has been precoated with a phosphate ester type epoxy such as zinc phosphate. The polymer also should contain a curing agent present in an amount of 2–5% of the polymer such as dicyanidimide; the polymer may also contain a dispersing agent present in an amount of 0.3–1.5% such as 2,4,6 tri dimethylamino ethyl phenol. The carrier for such polymer may be mineral spirits or butyl acetate.

Figure 12:
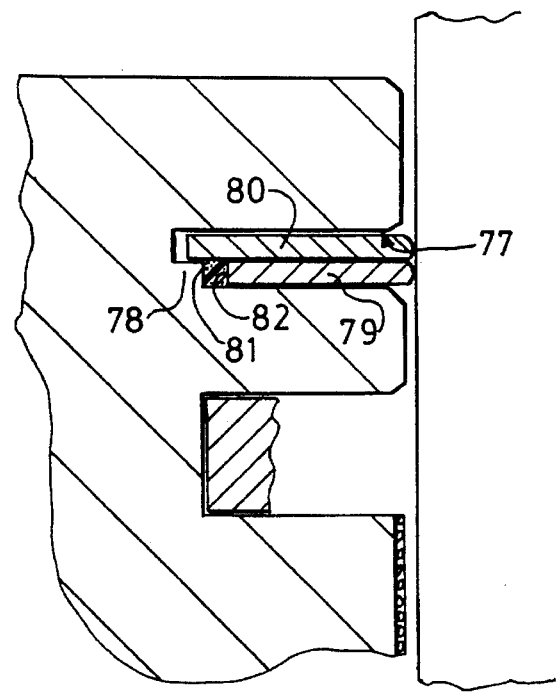
FIG. 12 is a fragmentary view, like FIG. 6, for an alternative embodiment.

As shown in FIG. 12, the enlarged groove 77 may be stepped at 78. This divides the groove into an upper space and a lower space; the step height is generally commensurate with the height of the lowermost compression ring 79. Gas pressure acts on the top of the upper compression ring 80 to urge the superimposed rings together and against the bottom of the groove 77; the rings have a high coefficient of friction at their mating surfaces to act in unison. The uppermost ring 80 will seal against the top of the step 78 while mating with the lowermost ring. The elastomeric ring 81 is slightly less in height than the step and acts only on the inner surface 82 of the ring 79; ring 81 is compressed during installation to exert a radially outward bias force on the ring 79.

The stepped configuration of the compression ring groove is of importance. It eliminates cocking of the rings within the groove because of the double fulcrum resulting from the step and the lower ring, if cocking were to be triggered. However, because of the continuous contact of the coordinated rings with the bottom of the groove under most conditions, as forced by the pressure of chamber gases, the rings are consistently urged downward. The ability of the rings to cock or flutter within such a stepped groove is significantly reduced.

The invention also comprehends a method of reducing piston ring blow-by (a new use application) in an oil bathed cylinder bore wall 68 of an internal combustion engine 83. The method reduces noxious emissions 84 from the engine, reduces contamination of the engine oil 85 for a lubrication system, and permits the engine 83 to be operated at higher compression ratios with improved efficiency. The method (with reference to FIG. 14) comprises the steps of: (i) providing a piston 86 with an annular groove 43 coated with solid film lubricant 76 stable at high temperatures (such as at least 600° F.); (ii) inserting a pair of matingly superimposed split compression rings 41,42 into such stepped groove with the split ends of the rings out of superimposed alignment, substantially all of the non-mating surfaces of the rings being coated with a solid film lubricant 76 stable at high temperatures, and (iii) reciprocatingly operating the piston assembly in the bore wall 68 for carrying out engine operation. Four stroke operation would comprise induction or injection of a combustible mixture into the combustion chamber 87 as permitted by intake valve 88, compression, ignition by a sparking device 89, and exhausting through exhaust valve 90 of emissions 84 (the piston 86 reciprocating to drive a crankshaft 91 through a connecting rod 92; the bore wall and piston being splashed with oil to be retained by the oil film 76), whereby the rings 41,42 act in unison due to the mating friction therebetween and are free to radially adjust as a unit with little or no inhibiting friction while maintaining sealing engagement with the bottom side 50 of the groove and the oil film 65 of the bore wall.

Because blow-by and oil pumping is substantially eliminated, emissions 84 are reduced in noxious content by as much as 20%; oil migration is prevented from contributing to hydrocarbons in the combustion chamber, the oil supply is not consumed, and the oil is retained as essentially ash free and uncontaminated because combustion gases cannot migrate to the oil reservoir. Uncontaminated oil is vented through a passage 69 communicating with the oil sump. The significant reduction in ring friction and improved tension contact with the oil film of the bore wall leads to an improvement in fuel economy (up to 3%), reduced ring wear by up to 75%, and lower engine noise due to zero clearance.

We claim:

1. A piston and ring assembly operative within a cylindrical bore wall to retain pressurized fluid to one side of the assembly, the piston having a crown, an interior, and an annular side wall for movement along the bore wall, comprising:

(a) a piston having at least one annular groove in the side wall of the piston;

(b) at least two split compression rings in each said groove effective to each substantially annularly engage the bore wall, the rings having mating superimposed surfaces to facilitate movement of the rings in unison as a result of friction therebetween;

(c) a compressed elastomeric ring disposed in said groove, acting between the piston and compression ring most-remote from said piston crown, to resiliently bias at least said most-remote-compression ring against the bore wall;

(d) a solid film lubricant coating essentially all of said groove and non-mating surfaces of said compression rings to effect reduced friction between said compression rings and groove while being biased by said elastomeric ring.

2. The assembly as in claim 1 in which said cylinder bore wall is in an internal combustion engine and said compressed elastomeric ring retains its compressed resiliency at temperatures as low as −20° F. and as high as +300° F.

3. The assembly as in claim 1 in which said elastomeric ring is constituted of a material selected from a group comprising (i) polysilanes and silastic, and (ii) fluoro polymers, said group being characterized by an ability to be stable at temperatures up to at least 450° F. without substantial cross-linking that reduces tensile elongation of about 25%.

4. The assembly as in claim 1 in which said groove has a height of at least 2 mm, and said non-mating solid lubricant surfaces being constituted of graphite.

5. The assembly as in claim 1 in which said elastomeric ring has a compression of about 10–20% at room temperature when installed, a compression of about 5% at −20° F. and a compression of about 25% at 300° F.

6. The assembly as in claim 1 which further comprises means to cool the piston interior to prevent said elastomeric ring from exceeding 300° F. in temperature under all operating conditions.

7. A piston and ring assembly operative within a cylinder bore of an internal combustion engine, the piston having a crown and an annular side wall for movement along the bore wall, comprising:

(a) walls defining one or more grooves in said side wall each with a step;

(b) a pair of superimposed mating split compression rings in each groove, each effective to exert a resilient circumferential sealing force against said bore wall but together are effective to act in unison as a result of friction therebetween, said rings being sized to permit said upper ring to engage both said step and lower ring when said lower ring is sealing against a side of said groove;

(c) an elastomeric ring acting between only said step and lower ring to resiliently bias said lower ring against said bore wall at temperatures as low as −20° F. and to thermally expand as the temperature rises up to as high as 300° F. to augment the sealing force of said lower ring; and (d) solid film lubricant coating said groove and non-mating surfaces of said rings to insure low friction engagement therebetween, said solid film lubricant being at least two of graphite, $MoS_2$ and BN.

8. An ultra low crevice volume piston and ring assembly operative within a cylinder bore wall, the piston having a crown with a depending annular side wall for movement along the bore wall, comprising:

(a) walls defining one or more annular grooves in said side wall each having at least on step;

(b) at least two split compression rings in each of said grooves having split ends, each effective to exert a resilient circumferential sealing force against said bore wall, said rings having mating surfaces superimposed one upon another to act in unison to provide sealing between said piston and bore wall, the split ends of said rings being out of superimposed alignment, the lower of said rings having a thickness generally commensurate with the height of the step to permit the upper ring to engage both said step and lower ring during sealing;

(c) an elastomer ring associated with each pair of compression rings and operative to resilient bias only the lower of said rings against said bore wall; and (d) a solid film lubricant coating said groove and the non-mating surfaces of said superimposed rings.

9. The assembly as in claim 8, in which said piston crown is exposed to high temperature combustion gases and said bore wall is oil lubricated to posses an oil film therealong, whereby said lower most compression ring serves to scrape oil to ensure sufficiency of said film, said assembly further comprising an additional element e comprising means to apply a heat absorbing fluid to the interior of said piston to control the temperature of said elastomeric ring.

10. The assembly as in claim 9, in which said rings are constructed of aluminum based metal, said solid film lubricant is comprised of a mixture of at least two of graphite, boron-nitride, and molydisulfide, and said elastomeric ring is constituted of polysilane or silastic.

11. The assembly as in claim 8 in which said groove step is comprised of right angle surfaces, and said elastomeric ring operates between said step and lower ring to be 10–20% compressed at room temperature.

12. The assembly as in claim 8 in which the distance between the uppermost of said grooves and said piston crown is no greater than 10 microns, and said piston is constituted of an aluminum alloy having a tensile strength of 25,000–48,000 psi.

13. The assembly as in claim 1, in which said superimposed rings and elastomeric ring substantially fill the volume of said groove except for (i) a radially inner space between the groove and upper ring and (ii) a gap tolerance between the ring pair and the side surfaces of said groove, said gap being less than 60 mm.

14. The assembly as in claim 13 in which said compression rings have dovetailed split ends.

15. The assembly as in claim 14 in which the dovetail construction of said split ends is in a circumferential direction.

* * * * *